(No Model.)

W. J. MUSSER.
FEED TROUGH.

No. 436,458. Patented Sept. 16, 1890.

Witnesses
Thos. Houghton.
Chas. F. Benjamin.

Inventor
William J. Musser,
By J. L. McFarland,
Attorney

UNITED STATES PATENT OFFICE.

WILLIAM J. MUSSER, OF ORANGEVILLE, ILLINOIS.

FEED-TROUGH.

SPECIFICATION forming part of Letters Patent No. 436,458, dated September 16, 1890.

Application filed June 16, 1890. Serial No. 355,577. (No model.)

*To all whom it may concern:*

Be it known that I, WILLIAM J. MUSSER, a citizen of the United States, residing at Orangeville, in the county of Stephenson and State of Illinois, have invented certain new and useful Improvements in Feed-Troughs for Animals; and I do declare the following to be a full, clear, and exact description of the invention, such as will enable others skilled in the art to which it appertains to make and use the same, reference being had to the accompanying drawings, and to the letters of reference marked thereon, which form a part of this specification.
This invention has relation to a trough combined with a storage-box adapted to keep the trough supplied with both long and short feed, and its object is to improve the means of effecting the various economies resulting from the use of feed-troughs of this class.

Figure 1:
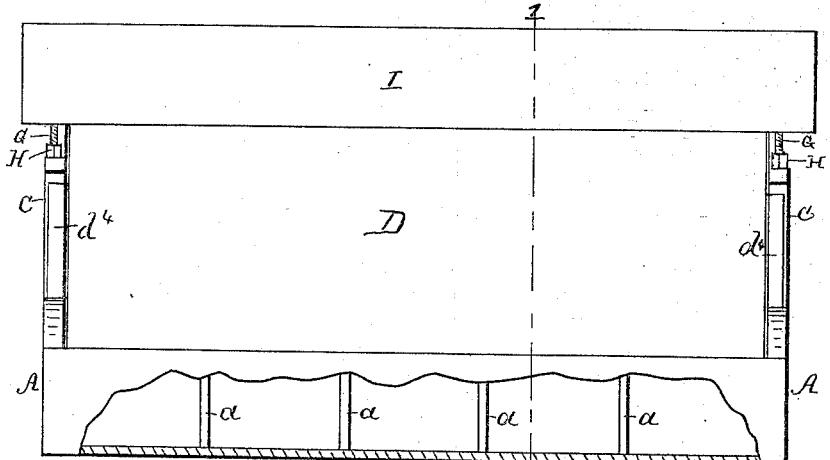
Figure 2:
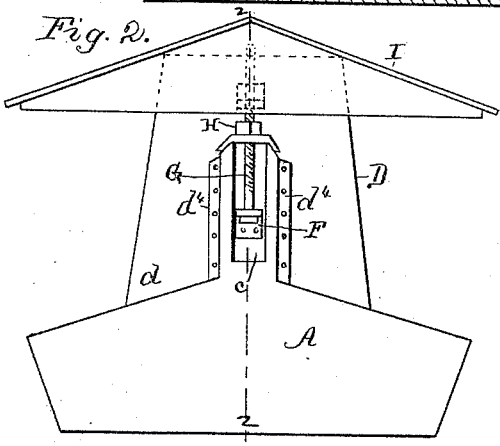
Figure 3:
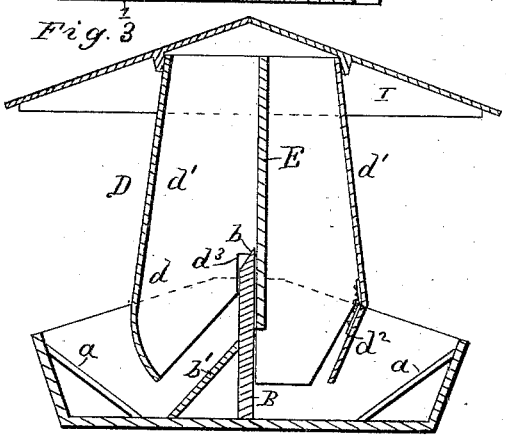

In the accompanying drawings, wherein like letters represent like parts, Figure 1 is a side elevation of the combined trough and box with a portion of the lower part broken away;
Fig. 2, an end elevation thereof; Fig. 3, a vertical cross-section on the line 1 1 of the first figure, and Fig. 4 a vertical longitudinal section on the line 2 2 of the second figure.

The invention consists in a particular construction and arrangement of the trough and box whereby they can be fitted together and separated at will, and when fitted together the feed will descend from the box to the trough as rapidly as the consumption of feed by the animals, aided by the adjustment of the box in relation to the trough, may require.

A is the feed-trough. I may choose to divide it into feeding-stalls by means of the bars $a$ to prevent hogs from rooting feed out of the trough onto the ground, to be there wasted or destroyed. Longitudinally in the center I provide the partition B to separate one kind of feed from another, according to the kinds supplied from the store-box. It will be seen from Fig. 3 that on one side this partition is formed along the edge into a bevel $b$, and on the same side the said partition is either formed into or provided with a slanting wall $b'$, the purpose of the bevel and the slant wall being to throw the feed descending from the store-box on that side of the partition to the front of the trough. This arrangement is more particularly designed for long feed. The ends of the trough A are prolonged vertically into standards C, between the inner faces of which the store-box descends when fitted to the trough. It will be noticed that the partition B has a square-cut recess $b^2$ at each end at the top in order to receive the end walls of the store-box as it fits down upon the feed-trough.

Figure 4:
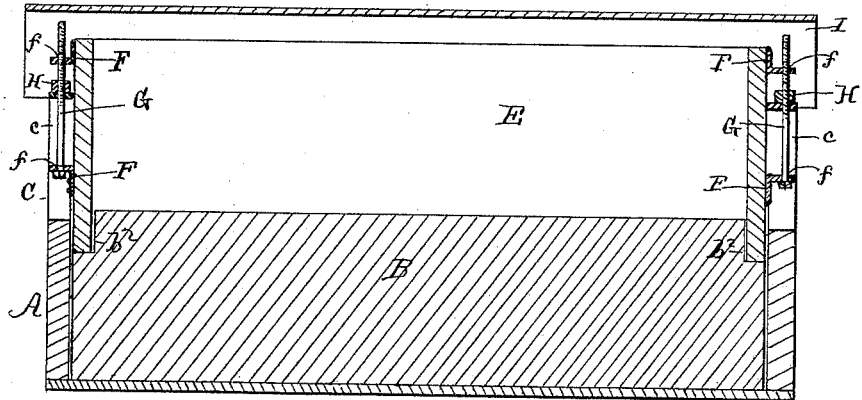

D is the store-box. The ends $d$ are wider at the bottom than at the top, as shown in Fig. 2, the object being to give an outward and downward slant to the sides $d$, so that the feed may not become choked in the box as it descends toward the trough. The box has a longitudinal partition E, dividing it into two compartments of unequal width. The wider compartment is intended for long feed and corresponds to that compartment of the trough which contains the slanting wall already described. I have preferred to give an inward curve to the bottom of the side $d'$, that forms part of the wide compartment, as shown in Fig. 3, because it affords more room to the feeding animals. The side $d'$, that forms part of the narrower compartment of the box, has a bottom strip $d^2$ attached to it by hinges, and this strip, which I call an "agitator," has a forward and backward swing produced by contact with the heads of the feeding animals, and facilitated by the diagonal cutting away of the lower adjacent corners of the ends $d$. The motion of this agitator in the process of feeding helps to shake down the feed contained in the narrow compartment. The opposite lower corners of the ends $d$ are also cut away diagonally to correspond with the cross outline of the slant-wall $b'$, upon which the store-box closes down. Perpendicular recesses $d^3$ are cut in the ends of the store-box to enable it to close down into the trough without obstruction from the partition B, the recessed upper part of which penetrates the wide compartment of the box and forms an interior wall. Perpendicular guide-strips $d^4$, as shown in Fig. 2, are formed on the ends of the box to receive the standards C, and so keep the box in correct lateral position. A long vertical slot $c$ is cut in each of the two standards. This slot, identical in both standards, affords room for the bolting of two right-angled brackets F to the end of the store-box, as shown in Fig. 4. Each bracket has an eye $f$ formed in it, and through these eyes is passed, head downward, a loose headed bolt G. The upper part of this inverted bolt is screw-threaded, and upon this part works a corresponding rectangular nut H, which bears upon the head of the standard. This nut may be turned by a wrench or other suitable tool, and the box raised or lowered at pleasure with relation to the feed-trough. The more it is raised the wider will be the spaces at the feet of the two compartments of the box for the passage of feed into the trough. Both store-box and feed-trough are protected by the movable cover I, which needs no further explanation than that afforded by the drawings.

I claim—

The combination of the feed-trough A, having the beveled and recessed partition B, the slanting wall $b'$, and the slotted standards C, the store-box D, having the longitudinal partition E, the eccentric and recessed end pieces $d$, the agitator $d^2$, and the vertical guide-strips $d^4$ upon the end pieces, the brackets F, attached to the end pieces of the said store-box and having the eyes $f$, the inverted screw-threaded head-bolt G, passed through said bracket-eyes, and the screw-threaded nut H upon said head-bolt, the whole constructed and arranged substantially as hereinbefore described.

In testimony whereof I affix my signature in presence of two witnesses.

WILLIAM J. MUSSER.

Witnesses:
JAC. M. MUSSER,
I. C. SCHADEL.